United States Patent [19]

Ichinose

[11] Patent Number: 5,450,161
[45] Date of Patent: Sep. 12, 1995

[54] MANUAL FOCUS CAMERA HAVING FOCUS DETECTING MEANS

[75] Inventor: Harunobu Ichinose, Yokohama, Japan

[73] Assignee: Canon Kabushiki Kaisha, Tokyo, Japan

[21] Appl. No.: 185,222

[22] Filed: Jan. 24, 1994

Related U.S. Application Data

[63] Continuation of Ser. No. 846,862, Mar. 6, 1992, abandoned.

[30] Foreign Application Priority Data

Mar. 11, 1991 [JP] Japan .................. 3-044899

[51] Int. Cl.⁶ .............................................. G03B 3/10
[52] U.S. Cl. ...................... 354/402; 354/195.1; 348/345
[58] Field of Search ............ 354/400, 402, 409, 195.1, 354/195.13; 348/345

[56] References Cited

U.S. PATENT DOCUMENTS 4,568,165 2/1986 Ishibashi ..................... 354/195.1
4,572,643 2/1986 Akashi ........................... 354/409
4,864,344 9/1989 Arakawa et al. ................ 354/400

FOREIGN PATENT DOCUMENTS 3828284 3/1989 Germany .
1-304409 12/1989 Japan .

*Primary Examiner*—W. B. Perkey
*Attorney, Agent, or Firm*—Fitzpatrick, Cella, Harper & Scinto

[57] ABSTRACT

A camera comprises a manual operation member, a converting device for converting the output of the operation of the manual operation member into electric signal which indicate at least the driving direction of a focus lens, a driving device for driving in response to the electric signal a motor which is the driving source for driving the focus lens, a focus detecting device for detecting the focus states of an object, and a controlling device for causing the motor to be stopped forcibly when an in-focus state is detected by the focus detecting device while the motor is driven on the basis of the electric signal. Hence enabling the focus lens to be stopped at an in-focus position accurately to simplify the operation required to obtain an in-focus state.

16 Claims, 2 Drawing Sheets

MANUAL FOCUS CAMERA HAVING FOCUS DETECTING MEANS

This application is a continuation of application Ser. No. 07/846,862 filed Mar. 6, 1992, now abandoned.

BACKGROUND OF THE INVENTION

1. Field of the Invention

The present invention relates to a camera capable of focusing manually.

2. Related Background Art

There is known a camera capable of focusing manually for performing focusing with a focusing motor to be driven on the basis of the pulse signals obtainable by converting the rotation of a manual operation ring into the pulse signals such as disclosed in U.S. Pat. No. 4,864,344.

However, in the conventional camera capable of focusing manually, the motor is arranged to be driven faithfully by the rotational amount of the manual operation ring. Accordingly, it is difficult to maintain an in-focus condition by stopping the motor in the in-focus state.

Also, when a driving operation is attempted over the entire area from the closet distance to infinity with a small rotational angle of the manual operation ring, the motor is naturally driven for a large amount (a plural step driving in case of a step motor, for example) for one pulse signal, and even if the manual operation ring should be rotated slowly for such an operation, there tends to occur a deviation from the in-focus state by that amount.

SUMMARY OF THE INVENTION

One aspect of this invention relates to a camera in which its focusing lens is driven by a motor to be driven by operating a manual operation member, and the aforesaid motor is forcibly stopped when a focus detecting means has detected an in-focus state so that the in-focus condition can be maintained, hence obtaining a significant enhancement of operation.

DETAILED DESCRIPTION OF THE PREFERRED EMBODIMENT

Figure 1:
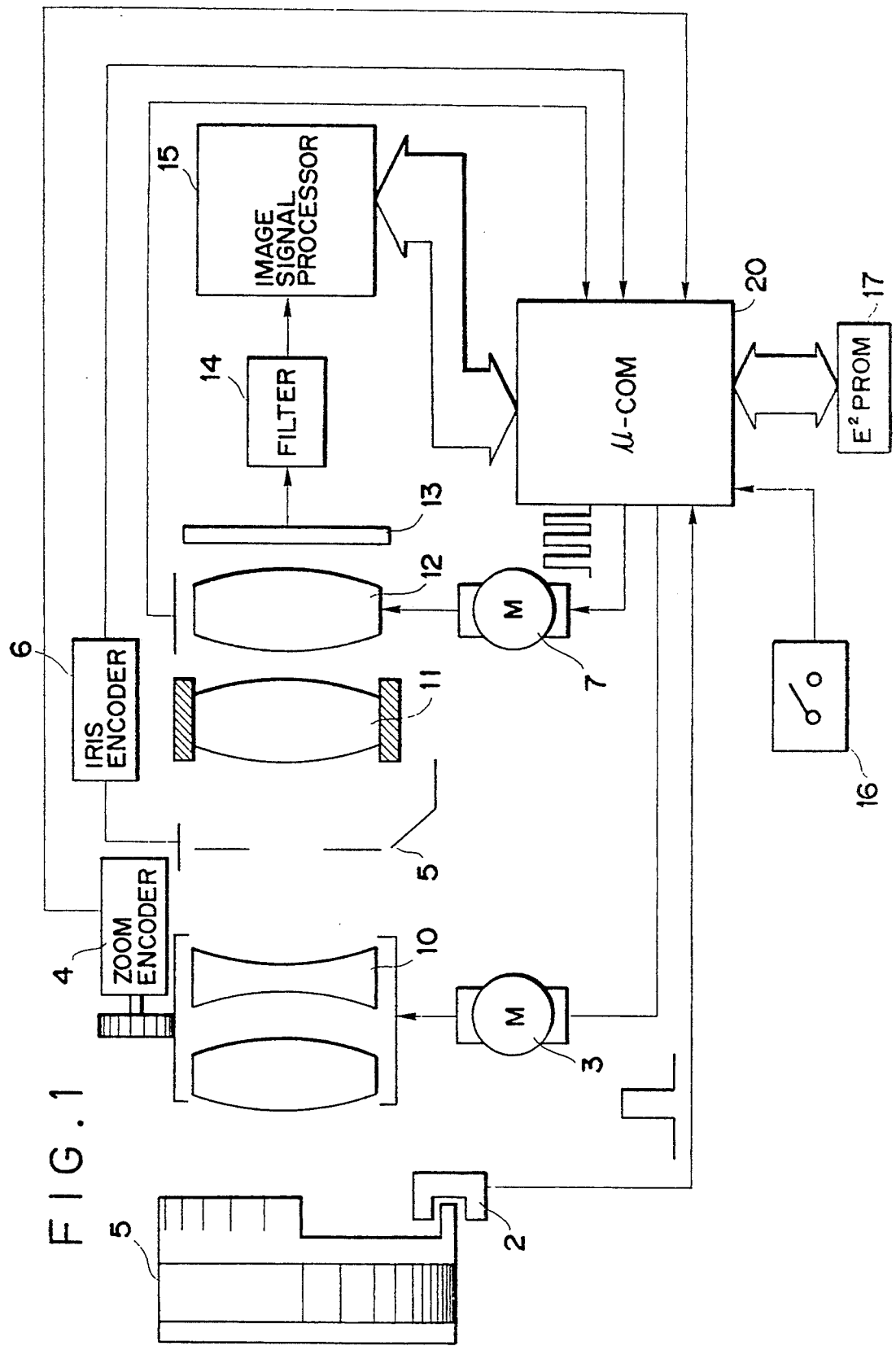
FIG. 1 is a view schematically showing the structure of a camera with a zoom lens according to an embodiment of the present invention.

In FIG. 1, a reference numeral 1 designates a manual operation ring which can be operated manually from the outside and is provided with a comb-shaped tooth of 72 teeth integrally formed by molding on its periphery; 2, a photointerrupter which generates electric signal pulses to indicate the rotational amount and rotational direction when a movement is detected by the comb-shaped teeth rotated by the aforesaid ring; 10, a variator lens driven by a zoom motor 3 and its position is detected by a zoom encoder 4. Between the variator lens 10 and a three-group relay lens 11, there is provided a diaphragm 5 capable of detecting diaphragm values by an iris encoder 6. Behind the diaphragm, a focus lens 12 is arranged as a rear relay. A focusing motor 7 which is a step motor is pulse driven by the driving signals from a microcomputer 20 which will be described later, thereby causing the focus lens lens 12 serving dually as focusing and compensator to be driven in the direction of optical axis. On the image formation plane, a CCD 13 is arranged and the photographing signals are transmitted to the microcomputer 20 for the focus detection through a filter 14 and an image signal processor 15 which executes the digital conversion. In this way, when the above-mentioned focus lens 12 reaches an in-focus-position, the in-focus state is detected.

A reference numeral 16 designates a mode switch for automatic focusing and manual focusing. When this switch is switched for the automatic focusing mode, the microcomputer 20 functions to determine whether a current out-of-focus condition is of a front focus or a rear focus in order to obtain the in-focus state by rotating the focusing motor 7 in either direction automatically, and 17, a non-volatile memory in which the driving information is stored for each of the object distances to maintain the in-focus condition of the focusing lens 12 resulting from the driving of the variator lens 10 obtainable from the zoom encoder 4.

In this respect, the focus lens 12 is driven to the resetting position before photographing. Thereafter, the absolute value of the current position is detected by the microcomputer 20 by continuously detecting the driving pulse number and rotational direction.

Subsequently, a further description will be made of the manual focusing.

When the manual operation ring 1 is rotated, the comb-shaped teeth are caused to pass the position of the two-piece photointerrupter 2. Thus, it is possible to know the rotational direction by the on-off logic and at the same time, to perform a conversion into the pulse signal of four times the tooth number. The pulse signals thus generated are inputted into the microcomputer 20 to cause the focusing motor 7 to be driven in either direction in accordance with the direction and pulse number. Hence the focusing lens 12 is driven in the direction of the optical axis to perform the required focusing. Therefore, in spite of the fact that the focusing lens 12 is pulse driven by the motor 7, it is possible for a photographer to perform a focusing as if the focusing is being performed with the feeling obtainable in operating the conventional helicoid system.

Also, the CCD 13 used here is a ½ inch (4.6×3.4) CCD, but in case of a camera of a high density image type, it is possible to adopt a CCD of 380,000 pixels, for example. Accordingly, the diameter of permissible circle of confusion is as close as 18 $\mu$m. In this example, the F value at the wide end is approximately one positional sensitivity degree of the focusing lens 12 for F 1.6, for example.

Therefore, when focusing is performed by detecting the focus changing signals from the image signals while driving the focusing lens 12 finely forward or backward under the above-mentioned conditions, it is considered necessary for a focusing lens 12 to acquire a resolution for a ½ of one side depth of focus. Consequently, its minimal driving amount is approximately 15 $\mu$m. Also, in the case of this focusing lens 12, the focusing amount from the closest distance to infinity at the telescopic end is approximately 6.5 mm, for example, and the total stroke becomes 434 pulses.

Here, in order to obtain the number of the comb-shaped teeth for the manual focusing ring required for this focus lens 12 to perform focusing, it is necessary to generate pulses of 434/2: 217 for a 90-degree rotation of the manual operation ring 1 where the resolution of the focus lens 12 by the manual operation ring 1 is 2 pulses when the focusing is performed for the range from the closest distance to infinity at the rotational degrees of the manual operation ring 1.

Now, for the 90-degree portion, the tooth number is 217/4=54.25≃55 teeth. Therefore, 55×4=220 teeth are the total teeth number required for the manual operation ring 1. Also, when these teeth are made by a press or mold, the upper machining limit for the tooth width is approximately 0.8 mm, that is, 0.8×2×220=352 mm in terms of its circumference, which requires in turn a diameter of o 112. Therefore, this size is not practicable for any of the recent compact cameras.

In the present embodiment, the diameter of the ring tooth portion is defined to be o 40 or less in order to miniaturize a camera, and the tooth number is 72 teeth. Accordingly, the diameter of the tooth portion is o 16.7 mm. Thus, the resolution pulse number of the focus lens 12 is 434+{(72/4)×4}≃6 pulses where the rotation is 90 degrees as in the above case, and by driving the focus lens for six pulses for one pulse generated by the manual operation ring 1, it is possible to solve the above-mentioned problem. Moreover, in practice, the focusing motor 7 is controlled by the microcomputer 20 to come to a stop when an in-focus state is discriminated thereby even in the middle of the driving pulse number. Therefore, there is no possibility at all that the motor 7 comes to a stop in a state of greatly exceeding the depth of focus even if the six-pulse portion is driven per tooth.

Also, when diaphragm 5 presents a small aperture, there is no need for the automatic focusing to be operated. As a result, the discrimination is performed by the signals from the iris encoder at 6.

Figure 2:
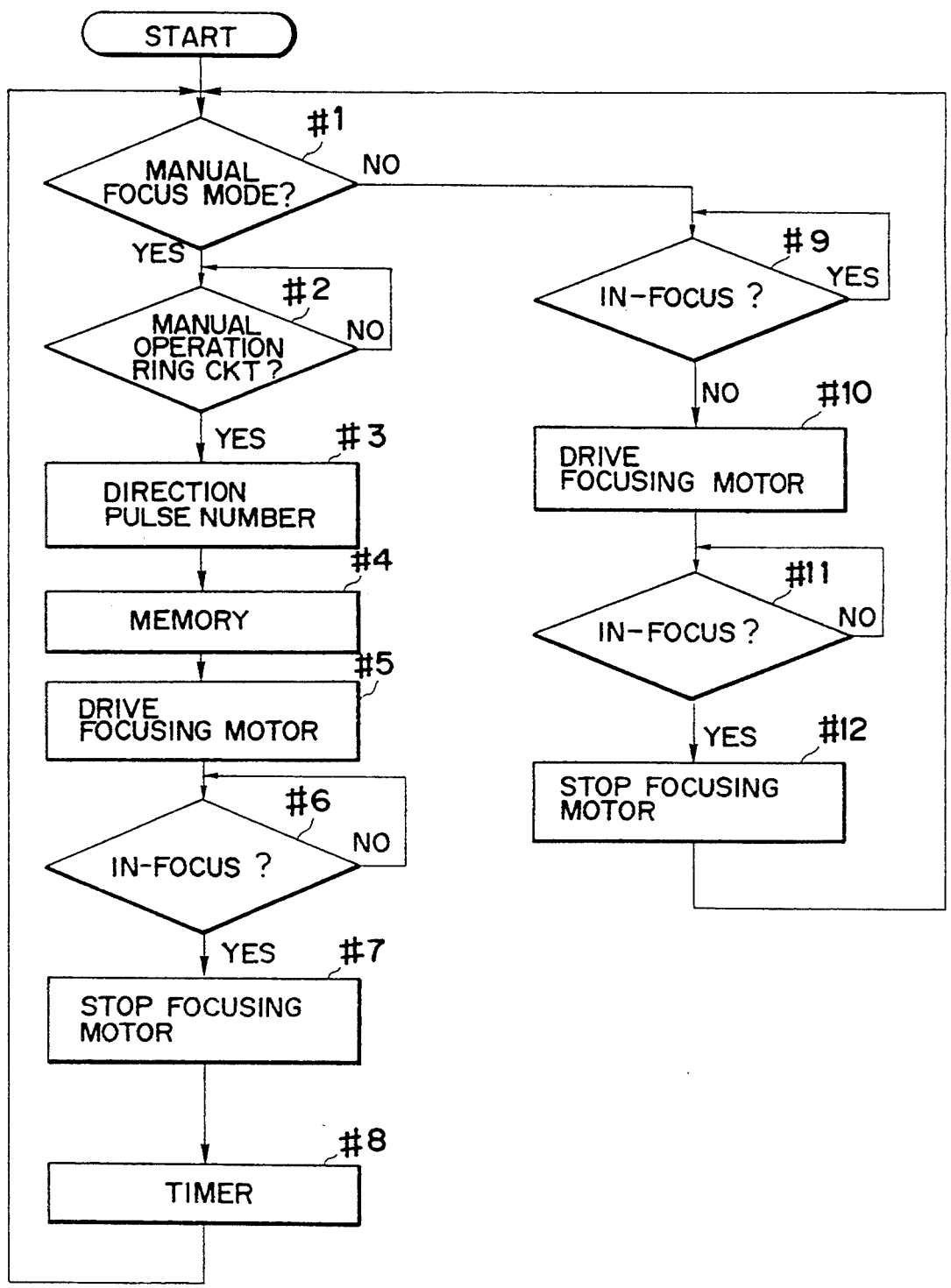
FIG. 2 is a flowchart showing the operation of the microcomputer shown in FIG. 1.

Now, in conjunction with FIG. 2, the operational flow of the microcomputer 20 will be described.

[Step 1] The current state of the mode switch 16 is detected. If the manual focusing mode has been selected, the process proceeds to step 2. If the automatic focusing mode has been selected, the process proceeds to step 9.

[Step 2] Whether any pulse signal has been output from the photointerrupter 2 due to the rotation of the manual operation ring 1 is detected.

[Step 3] When the manual operation ring 1 is rotated, its rotational direction and rotational amount (rotational angle) are read from the photointerrupter 2. In this respect, the reading is repeated at predetermined intervals.

[Step 4] The information read in the step 3 is temporarily stored in the memory. In this respect, the portion read last time but for which the focusing motor 7 is yet to be driven is added to a portion to be read for the next time.

[Step 5] The focusing motor 7 is driven in response to the direction of the rotation and rotational amount of the manual operation ring 1. In this respect, the focusing motor 7 is rotated for a six-pulse portion by the rotation of the manual operation ring 1 for one tooth portion.

[Step 6] The driving of the focusing motor 7 is continued until the in-focus state is detected. Here, the driven portion is subtracted from the value stored in the memory in the step 4.

[Step 7] The focusing motor 7 is forcibly stopped when the in-focus state is detected. In this respect, the interruption control is performed so that the focus lens 12 comes to a stop in the in-focus state assuredly by causing the focusing motor 7 to be stopped forcibly even in the middle of executing the original driving pulses (six pulses per tooth) based on the rotation of the manual operation ring 1.

[Step 8] Subsequent to the suspension of the driving of the focusing motor 7 when the in-focus state has been obtained in the step 7, the driving of the focusing motor 7 is disabled for a predetermined period (1 to 2 sec, for example) even if the manual operation ring 1 is operated.

Thereafter, as far as the focusing is of the manual focusing mode, the operation in the step 1 through step 8 is repeated.

[Step 9] If the focusing is switched to the automatic focusing mode, then the in-focus state at initial condition is detected. If it is found to be out of focus, the process proceeds to step 10.

[Step 10] The focusing motor 7 is driven in accordance with the detected focus conditions, front focus or rear focus.

[Step 11] The focusing motor 7 is driven until an in-focus state is obtained.

[Step 12] The focusing motor 7 is stopped in the in-focus state.

In the above-mentioned steps, the step 8 is important in view of the fact that with this step in executing a manual focusing, it is possible to determine whether the manual operation ring 1 is rotated without any knowledge of being already in an in-focus state or the aforesaid ring 1 is intentionally rotated to obtain an out-of-focus state while there is a knowledge of the in-focus state.

With the above-mentioned embodiment, it is possible to cause the aforesaid motor to be forcibly stopped when an in-focus state is detected even if the aforesaid motor is continuously driven on the basis of the electric signals being transmitted by the rotation of the aforesaid manual operation ring to drive the focus lens in the direction of the optical axis by driving the focusing motor in accordance with the rotation of the manual operation ring in performing a manual focusing. Hence enabling the focus lens to be stopped at an in-focus position accurately, leading to a simplified operation to obtain an in-focus state.

What is claimed is:

1. A camera, comprising:
   (a) a manual operation member for effecting operational movement;
   (b) converting means for converting the movement of said manual operation member into an electric signal, the electric signal indicating at least the driving direction of a focus lens, said converting means generating a pulse signal for a predetermined amount of operational movement of said manual operation member;
   (c) driving means for driving a step motor in response to the electric signal, the step motor being the driving source for driving the focus lens, said driving means driving the step motor for a predetermined plurality of steps in response to the pulse signal of said converting means;
   (d) focus detecting means for detecting the focus state of an object; and
   (e) controlling means for causing the step motor to be stopped forcibly when an in-focus state is detected by said focus detecting means during the driving of the step motor for the predetermined plurality of steps in response to the pulse signal of said converting means.

2. A camera according to claim 1, wherein said manual operation member comprising a rotative operation ring, and said converting means converts the rotational direction and rotational amount of said operation ring into said electric signal.

3. A camera according to claim 1, further comprising: means for disabling the driving of said step motor for a predetermined period of time subsequent to said step motor having been forcibly stopped by said controlling means if said pulse signal is generated by the movement of said manual operation member.

4. A camera according to claim 2, wherein said converting means causes the rotation of said operation ring to be converted into said pulse signal by a movement detecting sensor.

5. A camera according to claim 1, further comprising: an image pickup element for converting the image of said object into image pickup signal.

6. A camera according to claim 5, wherein said focus detecting means detects focus states on the basis of the image pickup signal output from said image pickup element.

7. A camera according to claim 1, wherein said focus lens serves dually to correct the deviation on an image formation plane at the time of a variable power.

8. An optical apparatus, comprising:
(a) a manual operation member for effecting operational movement;
(b) converting means for converting the movement of said manual operation member into an electric signal, the electric signal indicating at least the driving direction of a focus lens, said converting means generating a pulse signal for a predetermined amount of operational movement of said manual operation member;
(c) driving means for driving a step motor in response to the electric signal, the step motor being the driving source for driving the focus lens, said driving means driving the step motor for a predetermined plurality of steps in response to the pulse signal of said converting means; and
(d) controlling means for causing the step motor to be stopped forcibly when focusing comes to an in-focus state during the driving of the step motor for the plurality of steps in response to the pulse signal of said converting means.

9. An optical apparatus according to claim 8, wherein said manual operation member comprising a rotative operation ring, and said converting means converts the rotational direction and rotational amount of said operation ring into said electric signal.

10. An optical apparatus according to claim 8, further comprising:
means for disabling the driving of said step motor for a predetermined period of time subsequent to said step motor having been forcibly stopped by said controlling means if said pulse signal is generated by the movement of said manual operation member.

11. An optical apparatus according to claim 8, wherein said focus lens serves dually to correct the deviation on an image formation plane at the time of a variable power.

12. An optical apparatus, comprising:
(a) a manual operation member for effecting operational movement;
(b) converting means for converting the movement of said manual operation member into an electric signal, the electric signal indicating at least the driving direction of a focus lens, said converting means generating a pulse signal for a predetermined amount of operational movement of said manual operation member;
(c) driving means for driving a motor in response to the electric signal, the motor being the driving source for driving the focus lens, said driving means driving the focus lens for a predetermined amount in response to the pulse signal of said converting means; and
(d) controlling means for causing the motor to be stopped forcibly when focusing comes to an in-focus state during driving of the focus lens for the predetermined amount in response to the pulse signal of said converting means.

13. An optical apparatus according to claim 12, wherein said manual operation member comprising a rotative operation ring, and said converting means converts the rotational direction and rotational amount of said operation ring into said electric signal.

14. An optical apparatus according to claim 12, further comprising:
means for disabling the driving of said motor for a predetermined period of time subsequent to said motor having been forcibly stopped by said controlling means even if said pulse signal is generated by the operation of said manual operation member.

15. An optical apparatus according to claim 13, wherein said converting means causes the rotation of said operation ring to be converted into said pulse signal by a movement detecting sensor.

16. An optical apparatus according to claim 12, wherein said focus lens serves dually to correct the deviation on an image formation plane at the time of a variable power.

* * * * *

UNITED STATES PATENT AND TRADEMARK OFFICE
CERTIFICATE OF CORRECTION

Page 1 of 2

PATENT NO. : 5,450,161
DATED : September 12, 1995
INVENTOR(S) : Harunobu Ichinose It is certified that error appears in the above-indentified patent and that said Letters Patent is hereby corrected as shown below:

ABSTRACT:

Line 4, "indicate" should read --indicates--.

COLUMN 1:

Line 26, "closet" should read --closest--.

COLUMN 2:

Line 3, "of" should read --of the--;
Line 9, "in-focus-position," should read --in-focus position,--; and,
Line 42, "perform a" should read --perform--.

UNITED STATES PATENT AND TRADEMARK OFFICE
CERTIFICATE OF CORRECTION

PATENT NO. : 5,450,161
DATED : September 12, 1995
INVENTOR(S) : Harunobu Ichinose It is certified that error appears in the above-indentified patent and that said Letters Patent is hereby corrected as shown below:

COLUMN 3:

Line 12, "o 112" should read --∅ 112--;
Line 15, "o 40" should read --∅40--;
Line 17, "o16.7" should read --∅16.7--; and,
Line 19, "434+{(72/4)x4}~6" should read --434÷{(72/4)x4}~6--.

Signed and Sealed this

Nineteenth Day of March, 1996

Attest:

BRUCE LEHMAN

*Attesting Officer*   *Commissioner of Patents and Trademarks*